(12) United States Patent
Zhou et al.

(10) Patent No.: US 11,372,490 B2
(45) Date of Patent: Jun. 28, 2022

(54) TOUCH PANEL AND TOUCH DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Mingjun Zhou, Guangdong (CN); Pei Jia, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 127 days.

(21) Appl. No.: 16/966,948

(22) PCT Filed: Jun. 2, 2020

(86) PCT No.: PCT/CN2020/093838
§ 371 (c)(1),
(2) Date: Aug. 3, 2020

(87) PCT Pub. No.: WO2021/196393
PCT Pub. Date: Oct. 7, 2021

(65) Prior Publication Data
US 2021/0303090 A1 Sep. 30, 2021

(30) Foreign Application Priority Data
Mar. 30, 2020 (CN) .......................... 202010235964.X

(51) Int. Cl.
*G06F 3/041* (2006.01)
*B32B 7/14* (2006.01)

(52) U.S. Cl.
CPC .............. *G06F 3/0412* (2013.01); *B32B 7/14* (2013.01); *B32B 2457/208* (2013.01)

(58) Field of Classification Search
CPC ......... G06F 3/0412; G06F 3/041; B32B 7/14; B32B 2457/208; B32B 2307/732;
(Continued)

(56) References Cited

U.S. PATENT DOCUMENTS 3,557,413 A * 1/1971 Engle ................. A44B 18/0053
24/584.1
5,077,870 A * 1/1992 Melbye ............... B29C 67/0044
24/452

(Continued)

FOREIGN PATENT DOCUMENTS

CN 202189342 U 4/2012
CN 208654761 U 3/2019
(Continued)

*Primary Examiner* — Grant Sitta
(74) *Attorney, Agent, or Firm* — The Roy Gross Law Firm, LLC; Roy Gross

(57) ABSTRACT

A touch panel and a touch display panel are provided. The touch panel comprises: a touch layer provided with a plurality of first microstructures on an upper surface of the touch layer; and a cover plate provided with a plurality of second microstructures on a lower surface of the cover plate, wherein the second microstructures are adapted to the first microstructures, the cover plate is provided on the upper surface of the touch layer, and the plurality of second microstructures are adsorbed and self-locking connected to the plurality of first microstructures.

13 Claims, 2 Drawing Sheets

(58) Field of Classification Search
CPC ....... B32B 3/30; B32B 2457/202; B32B 7/08; B32B 2457/206
See application file for complete search history.

(56) References Cited

U.S. PATENT DOCUMENTS

| | | | | |
|---|---|---|---|---|
| 5,791,810 | A * | 8/1998 | Williams | F16B 5/0068 403/339 |
| 5,845,375 | A * | 12/1998 | Miller | A44B 18/0073 24/452 |
| 6,367,128 | B1 * | 4/2002 | Galkiewicz | A44B 18/0053 24/584.1 |
| 6,546,604 | B2 * | 4/2003 | Galkiewicz | A44B 18/0092 24/584.1 |
| 8,375,529 | B1 * | 2/2013 | Duffy | A44B 18/0053 24/452 |
| 8,961,850 | B2 * | 2/2015 | Wood | B32B 27/288 264/177.17 |
| 9,775,411 | B2 * | 10/2017 | Dyllong | A44B 18/0019 |
| 10,048,821 | B2 * | 8/2018 | Kang | G06F 3/0446 |
| 10,165,833 | B2 * | 1/2019 | Pariseau | A44B 18/0019 |
| 10,334,723 | B2 * | 6/2019 | Wald | H05K 5/0221 |
| 10,590,973 | B2 * | 3/2020 | Cosgrove | G09F 9/301 |
| 10,774,246 | B2 * | 9/2020 | Sitti | B29C 33/424 |
| 11,116,090 | B2 * | 9/2021 | Cosgrove | H05K 5/0017 |
| 11,160,334 | B2 * | 11/2021 | Gallant | A44B 18/0049 |
| 2007/0172971 | A1 * | 7/2007 | Boroson | H01L 51/5246 438/26 |
| 2009/0106953 | A1 * | 4/2009 | Wittig | B65D 33/24 24/442 |
| 2010/0258346 | A1 * | 10/2010 | Chen | H01L 23/564 174/521 |
| 2016/0291642 | A1 * | 10/2016 | Kwak | G06F 1/1641 |
| 2016/0330828 | A1 * | 11/2016 | Chu | G02F 1/1339 |
| 2017/0013918 | A1 * | 1/2017 | Ren | B60N 2/5833 |
| 2017/0142835 | A1 | 5/2017 | Ebrom et al. | |
| 2018/0135674 | A1 * | 5/2018 | Cosgrove | H01L 51/0097 |
| 2018/0177046 | A1 * | 6/2018 | Wald | H05K 5/0017 |
| 2018/0356859 | A1 * | 12/2018 | Hamburgen | G06F 3/0412 |
| 2019/0335587 | A1 | 10/2019 | Ebrom et al. | |
| 2019/0380217 | A1 * | 12/2019 | Cosgrove | H05K 5/0226 |
| 2020/0201482 | A1 * | 6/2020 | Weisse | G06F 3/04164 |

FOREIGN PATENT DOCUMENTS

| | | |
|---|---|---|
| CN | 109634463 A | 4/2019 |
| EP | 3169145 B1 | 8/2018 |
| TW | I463356 B | 12/2014 |

* cited by examiner

TOUCH PANEL AND TOUCH DISPLAY PANEL

BACKGROUND OF INVENTION

Field of Invention

The present application relates to the field of display technology, specifically, to a touch panel and a touch display panel.

Description of Prior Art

In conventional touch display devices, the touch display devices comprise a cover plate, a display panel, and a touch panel disposed between the cover plate and the display panel. When the cover plate and the touch panel are connected by glue, a cavity is formed between the cover plate, the touch panel, and the frame glue. Due to presence of the cavity, the touch display devices have a sense of space, and space occupied by the cavity is unstable. In addition, full lamination through the glue causes problems of complex process and difficulty of overflowing and clearing the glue.

SUMMARY OF INVENTION

The purpose of the embodiments of the present application is to provide a touch panel and a touch display panel, which can avoid the overflow of glue when connecting the touch layer and the cover plate, and can avoid the sense of space, thereby improving the user experience.

In a first aspect, an embodiment of the present application provides a touch panel, comprising:

a touch layer provided with a plurality of first microstructures on an upper surface of the touch layer; and a cover plate provided with a plurality of second microstructures on a lower surface of the cover plate, wherein the second microstructures are adapted to the first microstructures, the cover plate is provided on the upper surface of the touch layer, and the plurality of second microstructures are adsorbed and self-locking connected to the plurality of first microstructures.

In the touch panel described in the embodiment of the present application, the plurality of first microstructures are arranged at even intervals, and each of the first microstructures extends from one side of the touch layer to another opposite side; and the plurality of second microstructures are arranged at even intervals, and each of the second microstructures extends from one side of the cover plate to another opposite side.

In the touch panel provided by the embodiment of the present application, a plurality of first microstructures are provided on the upper surface of the touch layer, and a plurality of second microstructures are provided on the lower surface of the cover plate. the second microstructures are adapted to the first microstructures, the cover plate is arranged on the upper surface of the touch layer to avoid overflowing glue when connecting the touch layer and the cover plate, and to avoid the sense of space, thereby improving the user experience.

In the touch panel described in the embodiment of the present application, the first microstructures and the second microstructures are all elastic microstructures.

In the touch panel described in the embodiment of the present application, the plurality of first microstructures are evenly spaced in a matrix.

In the touch panel described in the embodiment of the present application, each of the first microstructures is L-shaped, each of the second microstructures is inverted L-shaped, and the first microstructures are hooked to the second microstructures.

In the touch panel described in the embodiment of the present application, each of the first microstructures comprises a first vertical portion and a first horizontal portion, one end of the first vertical portion is connected to the upper surface of the touch layer, and one end of the first horizontal portion is vertically connected to the other end of the first vertical portion;

each of the second microstructures comprises a second vertical portion and a second horizontal portion, one end of the second vertical portion is connected to the lower surface of the cover plate, and one end of the second horizontal portion is vertically connected to the other end of the second vertical portion; and the first horizontal portion is hooked between the second horizontal portion and the lower surface of the cover plate, and the second horizontal portion is hooked between the first horizontal portion and the upper surface of the touch layer.

In the touch panel described in the embodiment of the present application, a thickness of the first horizontal portion is equal to a distance between the second horizontal portion and the lower surface of the cover plate;

the thickness of the second horizontal portion is equal to the distance between the first horizontal portion and the upper surface of the touch layer.

In the touch panel described in the embodiment of the present application, the first horizontal portion and the second horizontal portion have a same length.

In the touch panel described in the embodiment of the present application, the first microstructure is T-shaped, and the second microstructure is inverted T-shape.

In the touch panel described in the embodiment of the present application, each of the first microstructures comprises a third vertical portion and a third horizontal portion, one end of the third vertical portion is vertically connected to the upper surface of the touch layer, a middle of the third horizontal portion is vertically connected to the other end of the third vertical portion; and each of the second microstructures comprises a fourth vertical portion and a fourth horizontal portion, one end of the fourth vertical portion is vertically connected to the lower surface of the cover plate, and a middle portion of the fourth horizontal portion is vertically connected to the other end of the fourth vertical portion.

In the touch panel described in the embodiment of the present application, the third vertical portion and the fourth vertical portion have a same size and shape, and the third horizontal portion and the fourth horizontal portion have a same size and same shape.

In the touch panel described in the embodiment of the present application, surfaces of the first microstructure and the second microstructure are smooth.

In a second aspect, an embodiment of the present application provides a touch display panel, comprising a touch panel and a display panel, and the touch panel is disposed on an upper surface of the display panel, the touch panel comprises:

a touch layer provided with a plurality of first microstructures on an upper surface of the touch layer; and a cover plate provided with a plurality of second microstructures on a lower surface of the cover plate, wherein the second microstructures are adapted to the first microstructures, the cover plate is provided on the upper surface of the touch layer, and the plurality of second microstructures are adsorbed and self-locking connected to the plurality of first microstructure.

In the touch display panel described in the embodiment of the present application, the plurality of first microstructures are arranged at even intervals, and each of the first microstructures extends from one side of the touch layer to another opposite side; and the plurality of second microstructures are arranged at even intervals, and each of the second microstructures extends from one side of the cover plate to another opposite side.

In the touch display panel described in the embodiment of the present application, the first microstructures and the second microstructures are all elastic microstructures.

In the touch display panel described in the embodiment of the present application, the plurality of first microstructures are evenly spaced in a matrix.

In the touch display panel described in the embodiment of the present application, each of the first microstructures is L-shaped, each of the second microstructures is inverted L-shaped, and the first microstructure is hooked to the second microstructure.

In the touch display panel described in the embodiment of the present application, each of the first microstructures comprises a first vertical portion and a first horizontal portion, one end of the first vertical portion is connected to the upper surface of the touch layer, and one end of the first horizontal portion is vertically connected to the other end of the first vertical portion;

each of the second microstructures comprises a second vertical portion and a second horizontal portion, one end of the second vertical portion is connected to the lower surface of the cover plate, and one end of the second horizontal portion is vertically connected to the other end of the second vertical portion; and the first horizontal portion is hooked between the second horizontal portion and the lower surface of the cover, and the second horizontal portion is hooked between the first horizontal portion and the upper surface of the touch layer.

In the touch display panel described in the embodiment of the present application, a thickness of the first horizontal portion is equal to a distance between the second horizontal portion and the lower surface of the cover plate;

the thickness of the second horizontal portion is equal to the distance between the first horizontal portion and the upper surface of the touch layer.

In the touch display panel described in the embodiment of the present application, the first horizontal portion and the second horizontal portion have a same length.

In the touch panel provided by the embodiment of the present application, a plurality of first microstructures are provided on the upper surface of the touch layer, and a plurality of second microstructures are provided on the lower surface of the cover plate. The second microstructures are adapted to the first microstructures, and the cover plate is arranged on the upper surface of the touch layer to prevent overflowing glue when connecting the touch layer and the cover plate, and to prevent the sense of space, thereby improving the user experience.

BRIEF DESCRIPTION OF DRAWINGS

In order to more clearly explain the technical solutions in the embodiments of the present application, the following will briefly introduce the drawings required in the description of the embodiments. Obviously, the drawings in the following description are only some embodiments of the present application. For those skilled in the art, without paying any creative work, other drawings can be obtained based on these drawings.

DETAILED DESCRIPTION OF PREFERRED EMBODIMENTS

Figure 1:
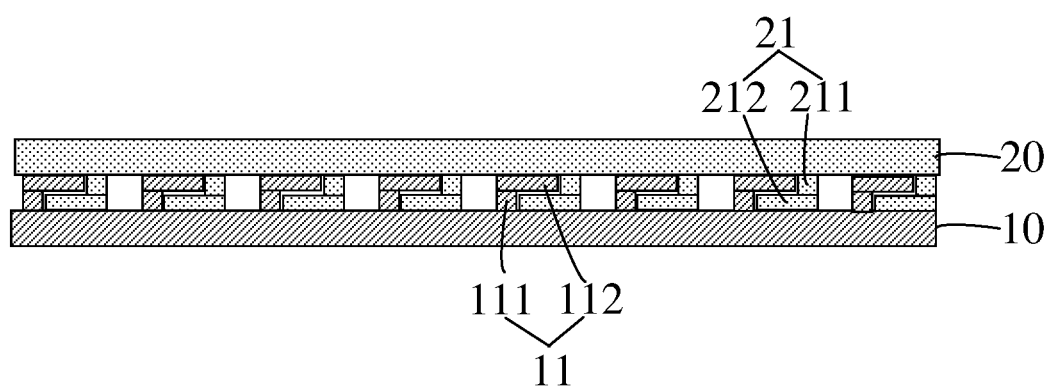
FIG. 1 is a schematic structural diagram of a touch panel provided by an embodiment of this application.

The technical solutions in the embodiments of the present application will be described clearly and completely in conjunction with the drawings in the embodiments of the present application.

In the description of this application, it should be noted that the orientation or positional relationship indicated by the terms "inner" and "outer" is based on the orientation or positional relationship shown in the drawings, or the orientation or positional relationship of the products conventionally placed in use of this application is only for the convenience of describing this application and simplifying the description, rather than indicating or implying that the device or element referred to must have a specific orientation, be constructed in a specific orientation and operation, so it cannot be understood as a limitation of this application. In addition, the terms "first", "second", etc. are only used to distinguish descriptions, and cannot be understood as indicating or implying relative importance.

It should also be noted that, unless otherwise clearly specified and defined, the terms "setup" and "connection" should be understood in a broad sense, for example, it can be a fixed connection, a detachable connection, or an integral connection. The connection can also be direct, or indirectly connected through an intermediate medium, which can be the connection between the two components. For those of ordinary skill in the art, the specific meaning of the above terms in this application can be understood in specific situations.

The descriptions of the following embodiments refer to the attached drawings to illustrate specific embodiments of the present invention that can be implemented. Directional terms mentioned in the present invention, such as "upper", "lower", "front", "rear", "left", "right", "inner", "outer", "side", etc., are for reference only Attach the direction of the schema. Therefore, the directional terminology is used to illustrate and understand the present invention, not to limit the present invention. In the figure, units with similar structures are indicated by the same reference numerals.

Please refer to FIG. 1, which is a schematic structural diagram of a touch panel provided by an embodiment of this application. Wherein, the touch panel comprises: a touch layer 10 and a cover plate 20 disposed on the touch layer 10. The cover plate 20 may be a glass cover.

An upper surface of the touch layer 10 is provided with a plurality of first microstructures 11; a lower surface of the cover plate 20 is provided with a plurality of second microstructures 21, the second microstructures 21 are adapted to the first microstructures 11, the cover plate 20 is provided on the upper surface of the touch layer 10, and the plurality of second microstructures 21 are adsorbed and self-locking connected to the plurality of first microstructures 11.

The upper surface of the touch layer 10 is a protective film layer, and an upper surface of the protective film layer is provided with the plurality of first microstructures 11.

Wherein, the first microstructures 11 and the second microstructures 21 are all elastic microstructures, which is convenient for forming self-locking, and the surfaces of the first microstructures 11 and the second microstructures 21 are smooth, which is convenient for mutual adsorption.

Figure 2:
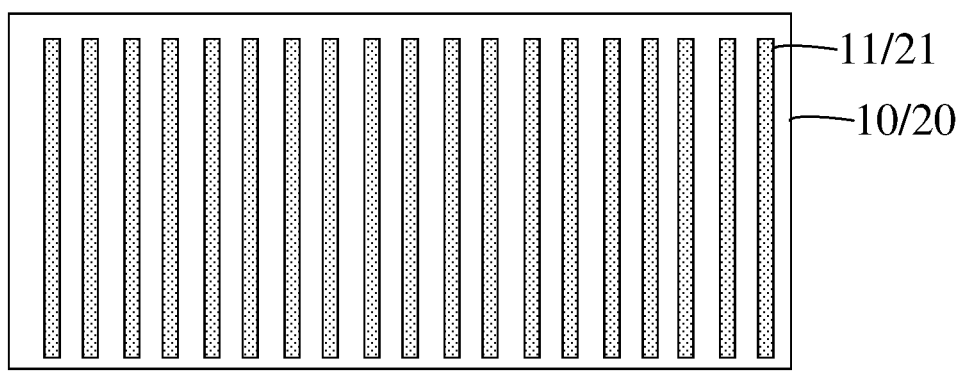
FIG. 2 is a schematic structural diagram of a connection surface of a cover plate or a touch layer of a touch panel provided by an embodiment of the present application.

As shown in FIG. 2, in some embodiments, the plurality of first microstructures 11 are arranged at even intervals, and each of the first microstructures 11 extends from one side of the touch layer 10 to another opposite side; and the plurality of second microstructures 21 are arranged at even intervals, and each of the second microstructures 21 extends from one side of the cover plate 20 to another opposite side.

Figure 3:
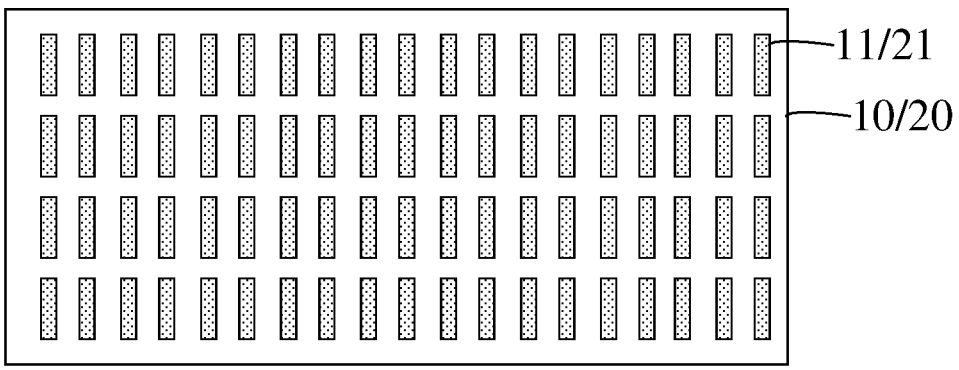
FIG. 3 is another schematic structural diagram of a connection surface of a cover plate or a touch layer of a touch panel provided by an embodiment of the present application.

As shown in FIG. 3, in some embodiments, the plurality of first microstructures 11 are evenly spaced in a matrix. The plurality of second microstructures 21 are evenly spaced in a matrix.

Please continue to refer to FIG. 1, each of the first microstructures 11 is L-shaped, each of the second microstructures 21 is inverted L-shaped, and the first microstructure 11 is hooked to the second microstructure 21.

Specifically, each of the first microstructures 11 comprises a first vertical portion 111 and a first horizontal portion 112, one end of the first vertical portion 111 is connected to the upper surface of the touch layer 10, and one end of the first horizontal portion 112 is vertically connected to the other end of the first vertical portion 111. Each of the second microstructures 21 comprises a second vertical portion 211 and a second horizontal portion 212, one end of the second vertical portion 211 is connected to the lower surface of the cover plate 20, and one end of the second horizontal portion 212 is vertically connected to the other end of the second vertical portion 211. The first horizontal portion 112 is hooked between the second horizontal portion 212 and the lower surface of the cover plate 20, and the second horizontal portion 212 is hooked between the first horizontal portion 112 and the upper surface of the touch layer 10.

Preferably, a thickness of the first horizontal portion 112 is equal to a distance between the second horizontal portion 212 and the lower surface of the cover plate 20; the thickness of the second horizontal portion 212 is equal to the distance between the first horizontal portion 112 and the upper surface of the touch layer 10. Moreover, the first horizontal portion 112 and the second horizontal portion 212 have a same length, so that when self-locking, there is no gap between the first microstructure and the second microstructure, which improves the adsorption force and reduces the thickness of the panel.

Wherein, the first horizontal portion 112, the first vertical portion 111, the second horizontal portion 212 and the second vertical portion 211 all have a rectangular parallelepiped shape.

In the touch panel provided by the embodiment of the present application, a plurality of first microstructures are provided on the upper surface of the touch layer, and a plurality of second microstructures are provided on the lower surface of the cover plate. The second microstructures are adapted to the first microstructures, and the cover plate is arranged on the upper surface of the touch layer to prevent overflowing glue when connecting the touch layer and the cover plate, and to prevent the sense of space, thereby improving the user experience.

Figure 4:
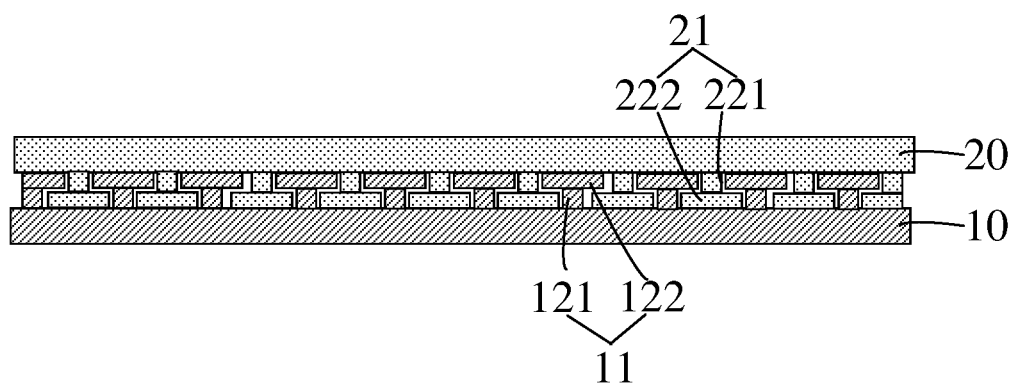
FIG. 4 is another schematic structural diagram of a touch panel provided by an embodiment of the present application.

Understandably, in some embodiments, as shown in FIG. 4, the touch panel comprises: a touch layer 10 and a cover plate 20 disposed on the touch layer 10.

An upper surface of the touch layer 10 is provided with a plurality of first microstructures 11; a lower surface of the cover plate 20 is provided with a plurality of second microstructures 21, the second microstructures 21 are adapted to the first microstructures 11, the cover plate 20 is provided on the upper surface of the touch layer 10, and the plurality of second microstructures 21 are adsorbed and self-locking connected to the plurality of first microstructures 11.

The upper surface of the touch layer 10 is a protective film layer, and an upper surface of the protective film layer is provided with the plurality of first microstructures 11.

Wherein, the first microstructures 11 and the second microstructures 21 are all elastic microstructures, which is convenient for forming self-locking, and the surfaces of the first microstructures 11 and the second microstructures 21 are smooth, which is convenient for mutual adsorption. Each of the first microstructures 11 is T-shaped, and each of the second microstructures 21 is inverted T-shaped.

Each of the first microstructures 11 comprises a third vertical portion 121 and a third horizontal portion 122, one end of the third vertical portion 121 is vertically connected to the upper surface of the touch layer 10, a middle of the third horizontal portion 122 is vertically connected to the other end of the third vertical portion 121; and each of the second microstructures 21 comprises a fourth vertical portion 221 and a fourth horizontal portion 222, one end of the fourth vertical portion 221 is vertically connected to the lower surface of the cover plate, and a middle portion of the fourth horizontal portion 222 is vertically connected to the other end of the fourth vertical portion 221.

Optionally, the third vertical portion 121 and the fourth vertical portion 221 have a same size and shape, and the third horizontal portion 122 and the fourth horizontal portion 222 have a same size and shape.

Wherein, the third vertical portion 121, the fourth vertical portion 221, the third horizontal portion 122, and the fourth horizontal portion 222 all have a rectangular parallelepiped shape.

In the touch panel provided by the embodiment of the present application, a plurality of first microstructures are provided on the upper surface of the touch layer, and a plurality of second microstructures are provided on the lower surface of the cover plate. The second microstructures are adapted to the first microstructures, and the cover plate is arranged on the upper surface of the touch layer to prevent overflowing glue when connecting the touch layer and the cover plate, and to prevent the sense of space, thereby improving the user experience.

Figure 5:
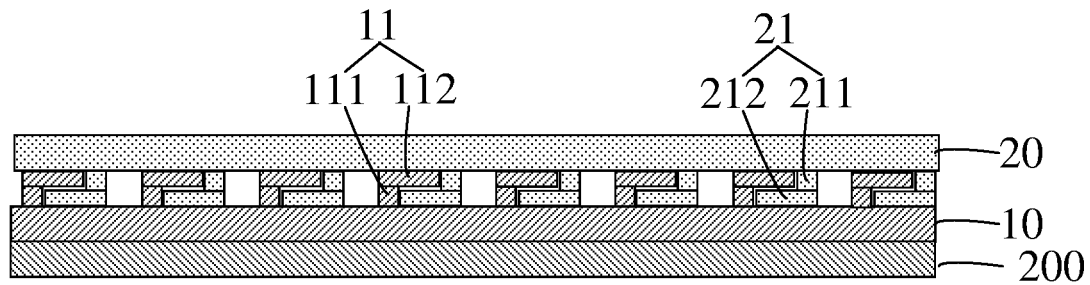
FIG. 5 is a schematic structural diagram of a touch display panel provided by an embodiment of the present application.

Please refer to FIG. 5, which is a schematic structural diagram of a touch display panel provided by an embodiment of the present application. The touch display panel comprises the touch panel in any of the above embodiments and a display panel 200. The touch panel is disposed on the display panel 200. The touch panel comprises: a touch layer 10 and a cover plate 20 disposed on the touch layer 10. The cover plate 20 may be a glass cover. An upper surface of the touch layer 10 is provided with a plurality of first microstructures 11; a lower surface of the cover plate 20 is provided with a plurality of second microstructures 21, the second microstructures 21 are adapted to the first microstructures 11, the cover plate 20 is provided on the upper surface of the touch layer 10, and the plurality of second microstructures 21 are adsorbed and self-locking connected to the plurality of first microstructures 11.

Understandably, the display panel 200 may be a liquid crystal display panel, an OLED display panel, or a micro-array LED display panel.

In the touch display panel provided by the embodiment of the present application, a plurality of first microstructures are provided on the upper surface of the touch layer, and a plurality of second microstructures are provided on the lower surface of the cover plate. The second microstructures are adapted to the first microstructures, and the cover plate is arranged on the upper surface of the touch layer to prevent overflowing glue when connecting the touch layer and the cover plate, and to prevent the sense of space, thereby improving the user experience.

The above are only examples of the present application, and are not used to limit the protection scope of the present application. For those skilled in the art, the present application may have various modifications and changes. Any modification, equivalent replacement, improvement, etc. within the spirit and principle of this application should be included in the scope of protection of this application.

What is claimed is:

1. A touch panel, comprising:
   a touch layer provided with a plurality of first microstructures on an upper surface of the touch layer; and
   a cover plate provided with a plurality of second microstructures on a lower surface of the cover plate, wherein the second microstructures are adapted to the first microstructures, the cover plate is provided on the upper surface of the touch layer, and the plurality of second microstructures are adsorbed and self-locking connected to the plurality of first microstructures;
   each of the first microstructures comprises a first vertical portion and a first horizontal portion, one end of the first vertical portion is connected to the upper surface of the touch layer, and one end of the first horizontal portion is vertically connected to the other end of the first vertical portion; each of the second microstructures comprises a second vertical portion and a second horizontal portion, one end of the second vertical portion is connected to the lower surface of the cover plate, and one end of the second horizontal portion is vertically connected to the other end of the second vertical portion; the first horizontal portion is hooked between the second horizontal portion and the lower surface of the cover plate, and the second horizontal portion is hooked between the first horizontal portion and the upper surface of the touch layer;
   a thickness of the first horizontal portion is equal to a distance between the second horizontal portion and the lower surface of the cover plate; and a thickness of the second horizontal portion is equal to a distance between the first horizontal portion and the upper surface of the touch layer.

2. The touch panel of claim 1, wherein the plurality of first microstructures are arranged at even intervals, and each of the first microstructures extends from one side of the touch layer to another opposite side; and
   the plurality of second microstructures are arranged at even intervals, and each of the second microstructures extends from one side of the cover plate to another opposite side.

3. The touch panel of claim 1, wherein the first microstructures and the second microstructures are all elastic microstructures.

4. The touch panel of claim 1, wherein the plurality of first microstructures are evenly spaced in a matrix.

5. The touch panel of claim 1, wherein each of the first microstructures is L-shaped, each of the second microstructures is inverted L-shaped, and the first microstructures are hooked to the second microstructures.

6. The touch panel of claim 5, wherein the first horizontal portion and the second horizontal portion have a same length, there is no gap between the first microstructure and the second microstructure.

7. The touch panel of claim 1, wherein surfaces of the first microstructures and the second microstructures are smooth.

8. A touch display panel, comprising a touch panel and a display panel, wherein the touch panel is disposed on an upper surface of the display panel, and the touch panel comprises:
   a touch layer provided with a plurality of first microstructures on an upper surface of the touch layer; and
   a cover plate provided with a plurality of second microstructures on a lower surface of the cover plate, wherein the second microstructures are adapted to the first microstructures, the cover plate is provided on the upper surface of the touch layer, and the plurality of second microstructures are adsorbed and self-locking connected to the plurality of first microstructure;
   each of the first microstructures comprises a first vertical portion and a first horizontal portion, one end of the first vertical portion is connected to the upper surface of the touch layer, and one end of the first horizontal portion is vertically connected to the other end of the first vertical portion; each of the second microstructures comprises a second vertical portion and a second horizontal portion, one end of the second vertical portion is connected to the lower surface of the cover plate, and one end of the second horizontal portion is vertically connected to the other end of the second vertical portion; the first horizontal portion is hooked between the second horizontal portion and the lower surface of the cover plate, and the second horizontal portion is hooked between the first horizontal portion and the upper surface of the touch layer;
   a thickness of the first horizontal portion is equal to a distance between the second horizontal portion and the lower surface of the cover plate; and a thickness of the second horizontal portion is equal to a distance between the first horizontal portion and the upper surface of the touch layer.

9. The touch display panel of claim 8, wherein the plurality of first microstructures are arranged at even intervals, and each of the first microstructures extends from one side of the touch layer to another opposite side; and
   the plurality of second microstructures are arranged at even intervals, and each of the second microstructures extends from one side of the cover plate to another opposite side.

10. The touch display panel of claim 8, wherein the first microstructures and the second microstructures are all elastic microstructures.

11. The touch display panel of claim 8, wherein the plurality of first microstructures are evenly spaced in a matrix.

12. The touch display panel of claim 8, wherein each of the first microstructures is L-shaped, each of the second microstructures is inverted L-shaped, and the first microstructures are hooked to the second microstructures.

13. The touch display panel of claim 12, wherein the first horizontal portion and the second horizontal portion have a same length, there is no gap between the first microstructure and the second microstructure.

\* \* \* \* \*